United States Patent
Gunn

(10) Patent No.: US 12,323,284 B2
(45) Date of Patent: Jun. 3, 2025

(54) EFFICIENT STAGGERED MULTI-TONE (SMT) MODULATION/DEMODULATION WITH TIME-DOMAIN PHASE ADJUSTMENT

(71) Applicant: L3Harris Technologies, Inc., Melbourne, FL (US)

(72) Inventor: Brian Gunn, Farmington, UT (US)

(73) Assignee: L3Harris Technologies, Inc., Melbourne, FL (US)

( * ) Notice: Subject to any disclaimer, the term of this patent is extended or adjusted under 35 U.S.C. 154(b) by 0 days.

(21) Appl. No.: 18/370,802

(22) Filed: Sep. 20, 2023

(65) Prior Publication Data

US 2025/0097090 A1    Mar. 20, 2025

(51) Int. Cl.
*H04L 27/26* (2006.01)
*H04L 25/03* (2006.01)

(52) U.S. Cl.
CPC ...... *H04L 27/265* (2013.01); *H04L 25/03006* (2013.01); *H04L 27/26526* (2021.01); *H04L 2025/03414* (2013.01)

(58) Field of Classification Search
CPC ............. H04L 27/265; H04L 27/26526; H04L 25/03006; H04L 2025/03414
See application file for complete search history.

(56) References Cited

U.S. PATENT DOCUMENTS 11,075,786 B1 * 7/2021 Shattil ................... H04L 5/0007
2019/0007181 A1   1/2019 Marinier et al.
2019/0089498 A1   3/2019 Pelletier et al.
2020/0235973 A1 * 7/2020 Wang ................... H04L 27/2639
2021/0014094 A1 * 1/2021 Nadal ................. H04L 27/2605

FOREIGN PATENT DOCUMENTS

EP    3437243 B1    6/2020
EP    3398282 B1    2/2022

OTHER PUBLICATIONS

Farhang et al., "Filter Bank Multicarrier for Massive MIMO", Feb. 24, 2014, pp. 7.

(Continued)

*Primary Examiner* — Janice N Tieu
(74) *Attorney, Agent, or Firm* — Fox Rothschild LLP; Carol E. Thorstad-Forsyth

(57) ABSTRACT

A staggered multi-tone (SMT) modulator that includes a Fourier transform module that is coupled to an input for receiving a complex valued data frame and that transforms the complex valued data frame from a frequency domain into a time domain. A symmetry extractor module extracts a conjugate symmetric data frame and a conjugate antisymmetric data frame from the transformed complex data frame. A first circular shift module performs a circular rotational phase shift on the conjugate symmetric data frame. A first filter filters the phase shifted conjugate symmetric data frame. A second circular shift module performs a circular rotational phase shift on the conjugate antisymmetric data frame. A second filter filters the phase shifted conjugate antisymmetric data frame. A summing module sums the phase shifted conjugate symmetric data frame and the phase shifted conjugate antisymmetric data frame to generate a modulated data frame.

20 Claims, 11 Drawing Sheets

(56) References Cited

OTHER PUBLICATIONS

Farhang-Boroujeny et al., "Cosine Modulated and Offset QAM Filter Bank Multicarrier Techniques: A Continuous-Time Prospect", EURASIP Journal on Advances in Signal Processing, vol. 2010, Article ID 165654, Dec. 14, 2009, pp. 1-16.
Farhang-Boroujeny, "Signal Processing Techniques for Software Radio", 2007, pp. 7.
Husam and Kollár, "Complexity Comparison of Filter Bank Multicarrier Transmitter Schemes," 2018 11th International Symposium on Communication Systems, Networks & Digital Signal Processing (CSNDSP), pp. 1-4 (2018).
Varga and Kollár, "Low complexity FBMC transceiver for FPGA implementation," 2013 23rd International Conference Radioelektronika (Radioelektronika), pp. 219-223 (2013).

* cited by examiner

| (128-point FFT) | Instance | Total LUTs | Logic LUTs | LUTRAMs | SRLs | FFs | RAMB36 | RAMB18 | DSP Blocks |
|---|---|---|---|---|---|---|---|---|---|
| 710 — Conventional | AFB+SFB | 10807 | 7943 | 1056 | 1808 | 19805 | 0 | 8 | 88 |
| 720 — Innovation | AFB+SFB | 9168 | 6462 | 528 | 2178 | 24833 | 0 | 4 | 68 |
| 730 — Difference | Innovation-Conventional | -15% | -19% | -50% | 20% | 25% | 0% | -50% | -23% |
| 740 — Device Resources | xcku5p-sfvb784-1-i | 216960 | 216960 | 99840 | 216960 | 433920 | 480 | 960 | 1824 |

| (128-point FFT) | Instance | Total LUTs | Logic LUTs | LUTRAMs | SRLs | FFs | RAMB36 | RAMB18 | DSP Blocks |
|---|---|---|---|---|---|---|---|---|---|
| 710 — Conventional | (AFB+SFB)/Device Resources | 5.00% | 3.70% | 1.10% | 0.80% | 4.60% | 0.00% | 0.80% | 4.80% |
| 720 — Innovation | (AFB+SFB)/Device Resources | 4.20% | 3.00% | 0.50% | 1.00% | 5.70% | 0.00% | 0.40% | 3.70% |
| 750 — Difference | Innovation-Conventional | -0.80% | -0.70% | -0.50% | 0.20% | 1.20% | 0.00% | -0.40% | -1.10% |

*FIG. 7A*

EFFICIENT STAGGERED MULTI-TONE (SMT) MODULATION/DEMODULATION WITH TIME-DOMAIN PHASE ADJUSTMENT

FIELD OF THE INVENTION

Embodiments of the present invention generally relate to modulators and demodulators. More particularly, at least some embodiments of the invention relate to improved staggered multi-tone (SMT) modulators and demodulators.

BACKGROUND

Modulators and demodulators are essential elements of transmitter systems and receiver systems that are implemented in communications systems. Accordingly, several different types of modulators and demodulators have been developed based on the design needs of different communication systems. One type of existing modulators and demodulators are staggered multi-tone (SMT) modulators and demodulators. However, SMT modulators and demodulators consume a large number of resources of the computing system that they are implemented in. This is especially true for high data rates and systems requiring a high degree of precision. In FPGA implementations, there is a heavy Block RAM utilization. This large resource consumption and utilization in turn increases costs for the party implementing the SMT modulators and demodulators.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

An embodiment disclosed herein is related to a computing system that instantiates in memory a staggered multi-tone (SMT) modulator that includes a Fourier transform module that is coupled to an input for receiving a complex valued data frame and that transforms the complex valued data frame from a frequency domain into a time domain. A symmetry extractor module extracts a conjugate symmetric data frame and a conjugate antisymmetric data frame from the transformed complex data frame. A first circular shift module performs a circular rotational phase shift on the conjugate symmetric data frame. A first filter filters the phase shifted conjugate symmetric data frame. A second circular shift module performs a circular rotational phase shift on the conjugate antisymmetric data frame. A second filter filters the phase shifted conjugate antisymmetric data frame. A summing module sums the phase shifted conjugate symmetric data frame and the phase shifted conjugate antisymmetric data frame to generate a modulated data frame for an output that is coupled to the summing module.

Another embodiment disclosed herein is related to a computing system that instantiates in memory a staggered multi-tone (SMT) demodulator that includes a filter that filters a complex valued data frame received from a demodulator input to generate a phase one filtered data frame and a phase two filtered data frame. A first circular shift module performs a circular rotational phase shift on the phase one filtered data frame. A second circular shift module performs a circular rotational phase shift on the phase two filtered data frame. A symmetry extractor module extracts a conjugate symmetric data frame from the phase one data frame and extracts a conjugate antisymmetric data frame from the phase two data frame. A summing module sums the conjugate symmetric data frame and the conjugate antisymmetric data frame to generate a summed data frame. A Fourier transform module transforms the summed data frame from the time domain to the frequency domain to generate a demodulated data frame for an output that is coupled to the Fourier transform module.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIGS. 7A-7B disclose aspects of the resource utilization and performance of a specific embodiment of the SMT modulators and demodulators disclosed herein.

DETAILED DESCRIPTION

Figure 1:
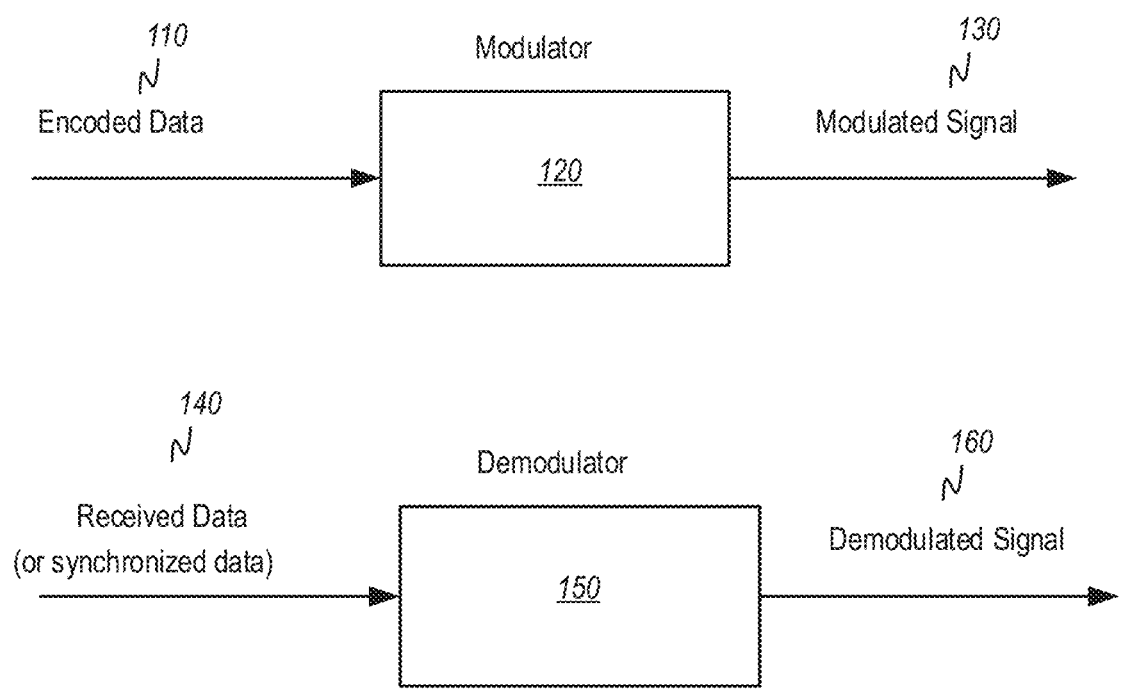
FIG. 1 discloses aspects of modulation and demodulation.

An embodiment disclosed herein is related to a computing system that instantiates in memory a staggered multi-tone (SMT) modulator that includes a Fourier transform module that is coupled to an input for receiving a complex valued data frame and that transforms the complex valued data frame from a frequency domain into a time domain. A symmetry extractor module extracts a conjugate symmetric data frame and a conjugate antisymmetric data frame from the transformed complex data frame. A first circular shift module performs a circular rotational phase shift on the conjugate symmetric data frame. A first filter filters the phase shifted conjugate symmetric data frame. A second circular shift module performs a circular rotational phase shift on the conjugate antisymmetric data frame. A second filter filters the phase shifted conjugate antisymmetric data frame. A summing module sums the phase shifted conjugate symmetric data frame and the phase shifted conjugate antisymmetric data frame to generate a modulated data frame for an output that is coupled to the summing module.

Another embodiment disclosed herein is related to a computing system that instantiates in memory a staggered multi-tone (SMT) demodulator that includes a filter that filters a complex valued data frame received from a demodulator input to generate a phase one filtered data frame and a phase two filtered data frame. A first circular shift module performs a circular rotational phase shift on the phase one filtered data frame. A second circular shift module performs a circular rotational phase shift on the phase two filtered data frame. A symmetry extractor module extracts a conjugate symmetric data frame from the phase one data frame and extracts a conjugate antisymmetric data frame from the phase two data frame. A summing module sums the conjugate symmetric data frame and the conjugate antisymmetric data frame to generate a summed data frame. A Fourier transform module transforms the summed data frame from the time domain to the frequency domain to generate a demodulated data frame for an output that is coupled to the Fourier transform module.

A. Context for an Example Embodiment of the Invention

Because the principles of the present invention are related to modulators and demodulators that are used in a communication system, a discussion of modulators, demodulators and communication systems will first be given. In electronics and telecommunications, modulation is the process of varying one or more properties of a periodic waveform, called the carrier signal, with a separate signal called the modulation signal that typically contains information to be transmitted. For example, the modulation signal might be an audio signal representing sound from a microphone, a video signal representing moving images from a video camera, or a digital signal representing a sequence of binary digits, a bitstream from a computer.

This carrier wave usually has a much higher frequency than the message signal does. This is because it is impractical to transmit signals with low frequencies. In radio communication, the modulated carrier is transmitted through space as a radio wave to a radio receiver.

Another purpose of modulation is to transmit multiple channels of information through a single communication medium, for example, using frequency-division multiplexing (FDM). For example, in cable television (which uses FDM), many carrier signals, each modulated with a different television channel, are transported through a single cable to customers. Since each carrier occupies a different frequency, the channels do not interfere with each other. At the destination end, the carrier signal is demodulated to extract the information bearing modulation signal. A modulator is a device or circuit that performs modulation. A demodulator (sometimes detector) is a circuit that performs demodulation, the inverse of modulation.

FIG. 1 illustrates an example embodiment of modulation and demodulation. As illustrated in the upper part of FIG. 1, a modulator 120 receives encoded data 110 as input. The encoded data may be encoded by any reasonable encoding scheme such as, but not limited to, Quadrature Phase Shift Keying (QPSK) or Quadrature Amplitude Modulation (QAM). The encoded data 110 may typically be thought of as data that includes information for further use by other elements of a system. The modulator 120, which may be any reasonable modulator that is configured to work with the encoded data 110, performs a modulation operation on the encoded data 110 that modulates the encoded data 110 onto a carrier signal for further transmission. The modulation operation produces a modulated signal 130 as an output of the modulator 120. The modulated signal includes the encoded data 110 modulated onto the carrier signal.

As illustrated in the lower part of FIG. 1, a demodulator 150 receives received or synchronized data 140 as an input. The received or synchronized data 140 typically includes data such as encoded data 110 that has been modulated onto a carrier signal that includes the information to be used by the other elements of the system. The demodulator 150 performs a demodulation operation on the received or synchronized data 140 that demodulates the encoded data from the carrier signal. The demodulation operation produces a demodulated signal 160 that includes the information to be used by the other elements of the system. The demodulated signal 160 can then be provided to the other elements of the system.

Figure 2A:
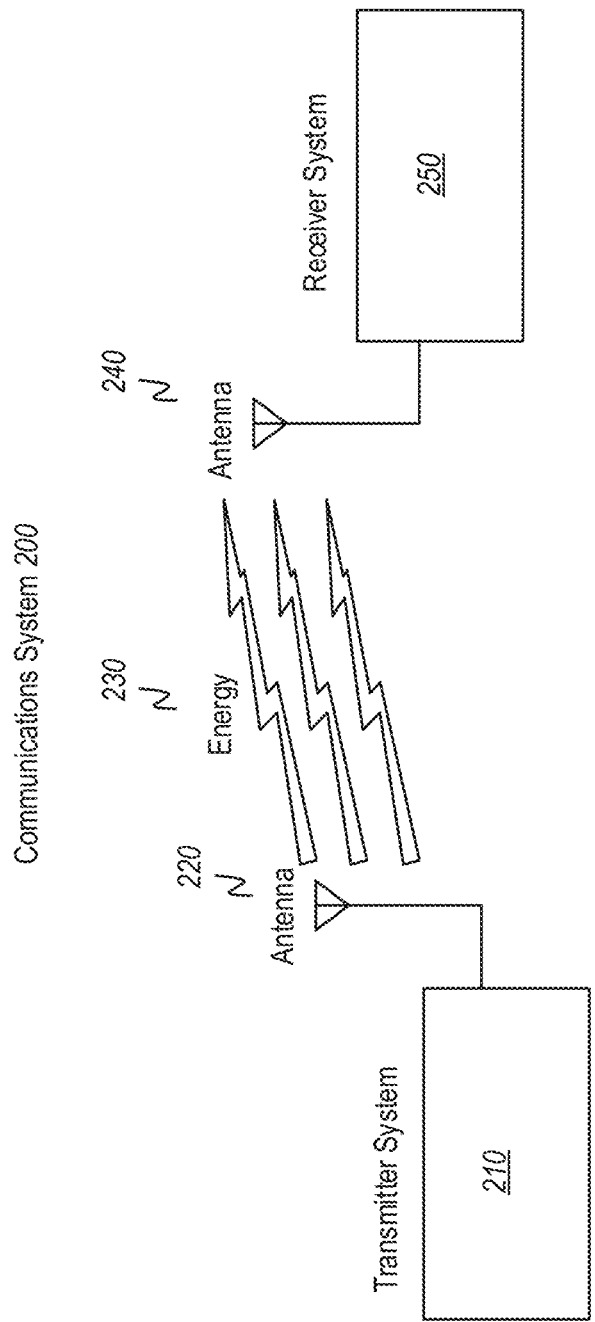
FIGS. 2A-2C disclose aspects of a communication system including a transmitter system and a receiver system.

FIG. 2A illustrates an embodiment of a communication system 200 that can be used for radio communication. As illustrated, the communication system 200 includes a transmitter system 210. As will be described in more detail to follow, the transmitter system 210 takes source data and then modulates the data for transmission to a receiver system 250. In the case of a radio communication system, the source data may be the voice of a sender. Accordingly, the transmitter system 210 includes an antenna 220, which may be any reasonable antenna, that is used to transmit the data to the receiver system 250. Since the embodiment is a radio communication system, the antenna 220 transmits energy 230 in the form of radio waves that includes the modulated signal.

The receiver system 250 includes an antenna 240 that receives the energy 230 including the modulated signal from the antenna 220. As will be described in more detail to follow, the receiver system 250 demodulates the received signal into a form that recovers the source data that was transmitted. This source data can then be used. For example, in the case of the radio communications system where the source data was the voice of the user, the demodulated signal would recover the voice of the sender so that a user of the receiver system can listen to the voice.

Figure 2B:
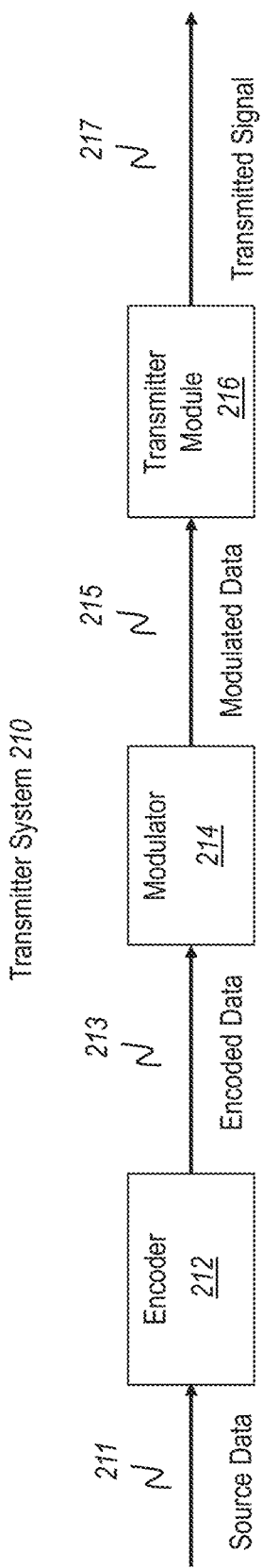

FIG. 2B illustrates further details of the operation of an embodiment of the transmitter system 210. As illustrated, the transmitter system 210 receives source data 211. The source data 211 is input into an encoder 212, which outputs encoded data 213, which may correspond to the encoded data 110 previously described. The encoded data 213 is then input into a modulator 214, which may correspond to the modulator 120 previously described. The modulator 214 outputs modulated data 215, which may correspond to the modulated signal 130 previously described, and which includes the encoded data 213 modulated onto a carrier signal. The modulated data 215 is then provided to a transmitter module 216, which may include further processes needed to prepare the modulated data 215 for transmission and also includes the antenna 220. The transmitter module 216 then transmits a transmitted signal 217, which may correspond to the energy 230.

Figure 2C:
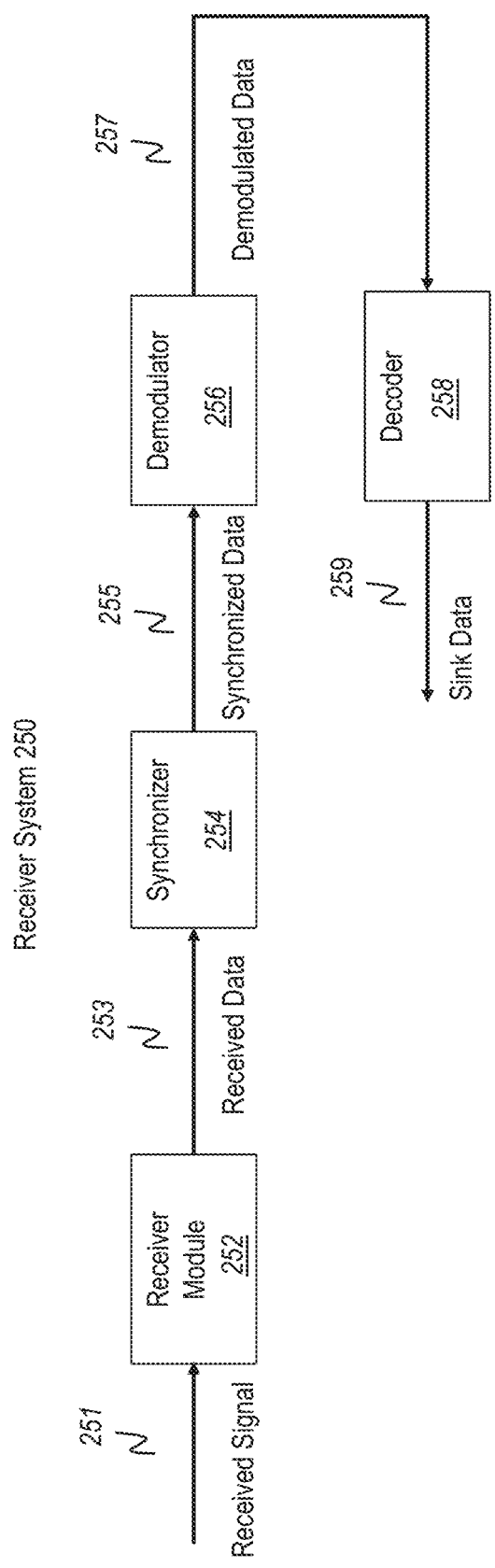

FIG. 2C illustrates further details of the operation of an embodiment of the receiver system 250. As illustrated, the receiver system 250 receives a received signal 251, which corresponds to the transmitted signal 217, at a receiver module 252. The receiver module 252 includes the antenna 240 and may also include additional processes such as post amplification on the received signal to thereby output received data 253. The received data 253 is input into a synchronizer 254, which provides synchronization and other down conversion processing as needed to output synchronized data 255. The synchronized data 255, which may correspond to the received or synchronized data 140 previously described is input into a demodulator 256, which may correspond to the demodulator 150 previously described. The demodulator 256 demodulates the synchronized data 255 to output demodulated data 257, which may correspond to the demodulated signal 160 previously described, and which includes the encoded data without the carrier signal. The demodulated data 257 is then input into a decoder 258. The decoder 258 is configured to decode the encoding done by the encoder 212. The decoder 258 then outputs sink data 259, which corresponds to the source data 211.

B. Aspects of Conventional Staggered Multi-Tone (SMT) Modulators and Demodulators Attention will now be given to describing aspects of a conventional Staggered Multi-Tone (SMT) modulator. These may also be referred to as Filter Bank Multicarrier-Offset Quadrature Amplitude modulators. In operation, these are similar to Cosine Modulated Multitone (CMT) and have a modulation step to eliminate inter-symbol interference (ISI) and inter-channel interference (ICI). A SMT demodulator performs the opposite operation of the SMT modulator.

Figure 3A:
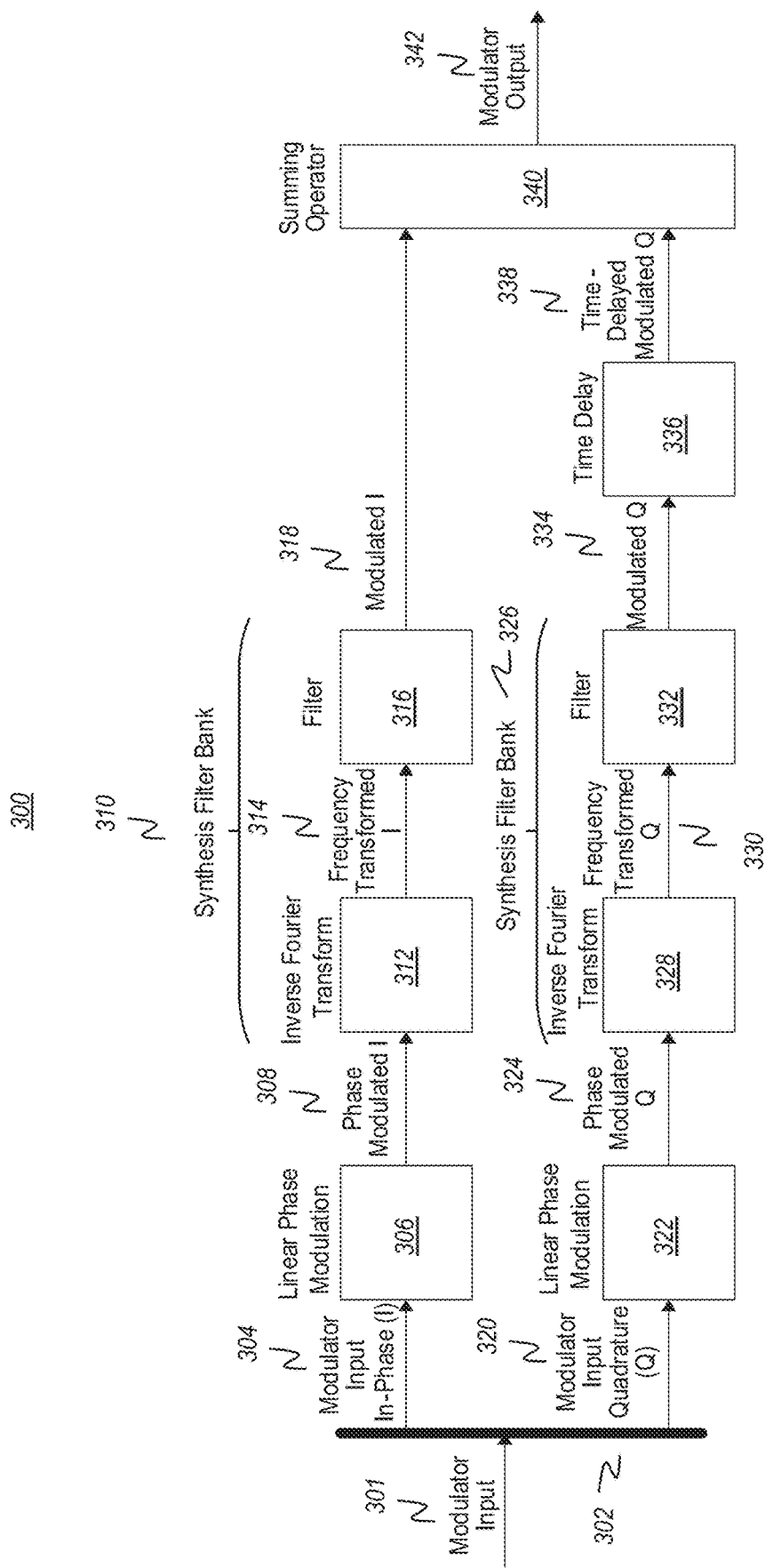
FIGS. 3A-3B disclose aspects of an embodiment of a conventional SMT modulator.

FIG. 3A illustrates an embodiment of a SMT modulator 300. The SMT modulator 300 may be a specific implementation of the modulator 120 and/or modulator 214 previously described. Thus, the SMT modulator 300 may be used in the transmitter system 210. The specific operation and functional elements of the SMT modulator 300 will now be explained.

As shown in FIG. 3A, the SMT modulator 300 receives a modulator input data frame 301, which may be complex valued input data having both real and imaginary components. As previously described in relation to FIGS. 1 and 2B, the modulator input data frame 301 may be encoded data that has been encoded in any reasonable manner.

The modulator input data frame 301 is received by a split module 302. In operation, the split module 302 splits the complex valued input data into its real and imaginary components. This split results in modulator input in-phase (I) data frame 304 that comprises the real components of the modulator input data frame 301 and modulator input quadrature (Q) data frame 320 that comprises the imaginary components of the modulator input data frame 301.

The modulator input in-phase data frame 304 is input into a linear phase modulation module 306 that provides a linear phase modulation of the modulator input in-phase data frame 304. The modulator input quadrature data frame 320 is input into a linear phase modulation module 322 that provides linear phase modulation of the modulator input quadrature data frame 320.

Figure 3B:
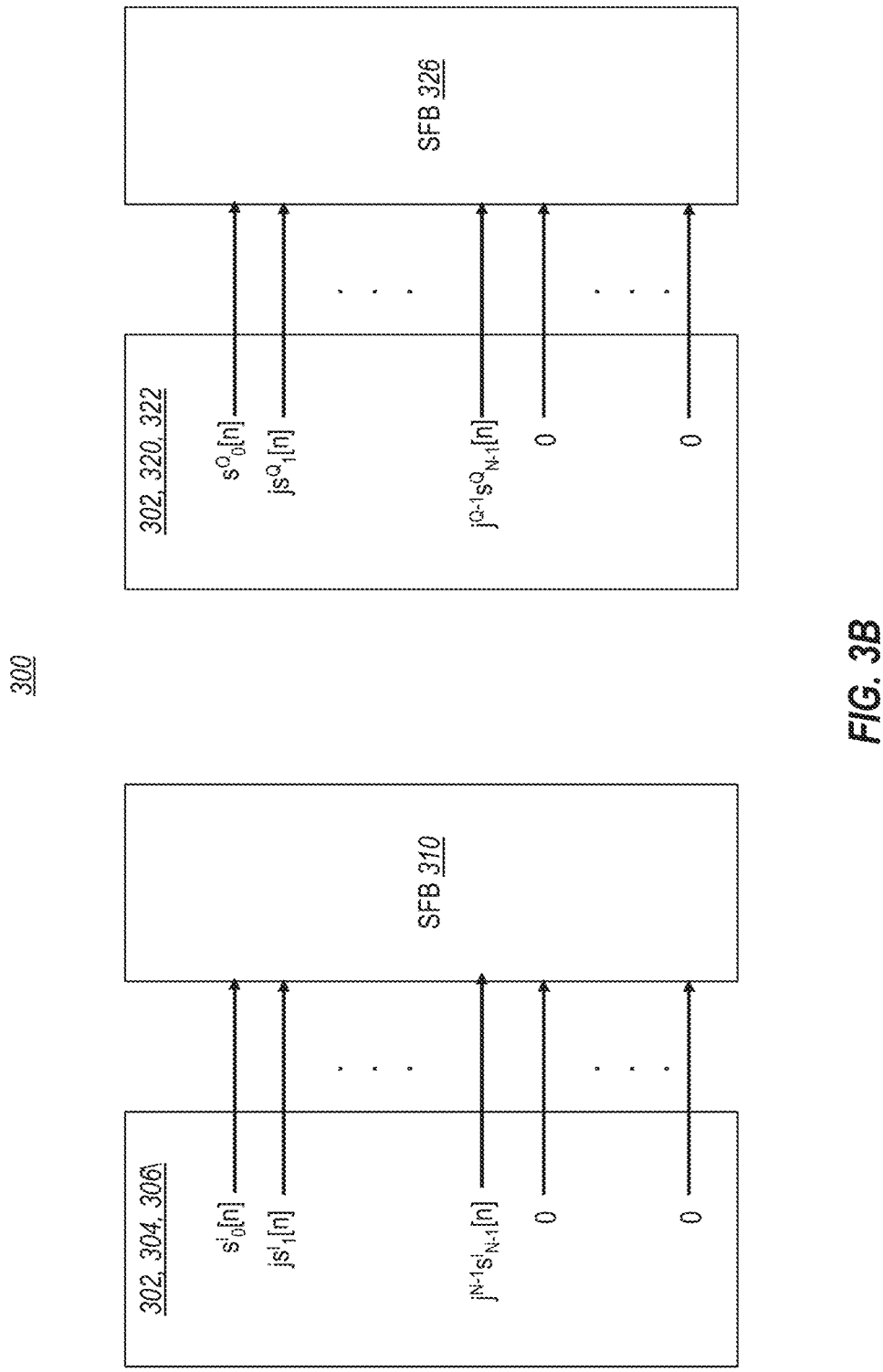

FIG. 3B illustrates an embodiment of the split module 302, the modulator input in-phase data frame 304, and the linear phase modulation module 306. In the embodiment of FIG. 3B, the modulator input data frame 301 is configured as a data frame having 256 samples. As illustrated in FIG. 3B, the split module 302 splits the modulator input data frame 301 into the real components, which are designed at $s^I[n]$, where the "I" indicates the modulator input in-phase data frame 304. Thus, the first frame sample is designated as $s^I_0[n]$, the second sample is designated as $s^I_1[n], \ldots s^I_{N-1}[n]$. In addition, FIG. 3B shows that each of the frame samples undergoes linear phase modulation in the linear phase modulation module 306, which is indicated by the "j" symbol for each frame sample, for example $js^I_1[n]$ and $j^{N-1}s^I_{N-1}[n]$. The indicates a linear phase difference generated by the linear phase modulation module 306. Each of the in-phase components are then fed to a Synthesis Filter Bank (SFB) 310 as phase modulated in-phase data frame 308 as will be described in more detail to follow. The "0" shown as input to the SFB 310 indicates that in some embodiments the data frame can be configured to have less than 256 complex data frame samples when needed and the "0" would be input for any position in the data frame that was not occupied by a complex data frame sample.

FIG. 3B also shows that the split module 302 splits the modulator input data frame 301 into the imaginary components, which are designed at $s^Q[n]$, where the "Q" indicates the modulator input quadrature data frame 320. The input modulator quadrature data frame 320 may be offset from the modulator input in-phase data frame 304 by one-half a data frame (or 128 samples in the illustrated embodiment). Thus, the modulator input in-phase data frame 304 and the modulator input quadrature data frame 320 overlap for one-half of the data frame. The first frame sample is designated as $s^Q_0[n]$, the second sample is designated as $s^Q_1[n], \ldots s^Q_{N-1}[n]$. In addition, FIG. 3B shows that each of the frame samples undergoes linear phase modulation in the linear phase modulation module 322, which is indicated by the "j" symbol for each frame sample, for example $js^Q_1[n]$ and $j^{N-1}s^Q_{N-1}[n]$. The indicates a linear phase difference generated by the linear phase modulation module 322. Each of the quadrature components are then fed to a Synthesis Filter Bank (SFB) 326 as phase modulated quadrature data frame 324 as will be described in more detail to follow. The "0" shown as input to the SFB 326 indicates that in some embodiments the complex data frame can be configured to have less than 256 samples when needed and the "0" would be input for any position in the data frame that was not occupied by a complex data frame sample.

As mentioned above, phase modulated in-phase data frame 308 is output from the linear phase modulation module 306 and provided to the SFB 310. The SFB 310 comprises an inverse Fourier transform module 312 and a filter 316. In some embodiments, the SFB 310 comprises a Fourier transform module in place of the inverse Fourier transform module 312. In operation, the inverse Fourier transform module 312 transforms the phase modulated in-phase data frame 308 from the frequency domain into the time domain and outputs transformed in-phase data frame 314 that is now in the time domain. Since the phase modulated in-phase data frame 308 is input into the inverse Fourier transform module 312, it may also be referred to as a Fourier transform frame.

The frequency transformed in-phase data frame 314 is input into the filter 316, which provides needed frequency-response and time-response shaping of the transformed in-phase data frame. In one embodiment, the filter 316 may be a polyphase synthesis filter. The filter 316 outputs modulated in-phase data frame 318.

As also mentioned above, phase modulated quadrature data frame 324 is output from the linear phase modulation module 306 and provided to the SFB 326. The SFB 326 comprises an inverse Fourier transform module 328 and a filter 332. In some embodiments, the SFB 326 comprises a Fourier transform module in place of the inverse Fourier transform module 328. In operation, the inverse Fourier transform module 328 transforms the phase modulated quadrature data frame 324 from the frequency domain into the time domain and outputs frequency transformed quadrature data frame 330 that is now in the time domain. Since the phase modulated quadrature data frame 324 is input into the inverse Fourier transform module 328, it may also be referred to as a Fourier transform frame.

The frequency transformed quadrature data frame 330 is input into the filter 332, which provides needed frequency-response and time-response shaping of the transformed data frame. In one embodiment, the filter 332 may be a polyphase synthesis filter. The filter 332 outputs modulated quadrature data frame 334 to a time delay module 336, which in one embodiment delays the modulated quadrature data frame 334 by one-half a data frame or 128 samples. The time delay module 336 outputs time-delayed modulated quadrature data frame 338.

The modulated in-phase data frame 318 and the time-delayed modulated quadrature data frame 338 are both input into a summing operator module 340. The summing operator module 340 sums the in-phase data frame 318 and the time-delayed modulated quadrature data frame 338 and outputs a modulator output data frame 342 that can be provided to a transmitter module such as the transmitter module 216.

Figure 4:
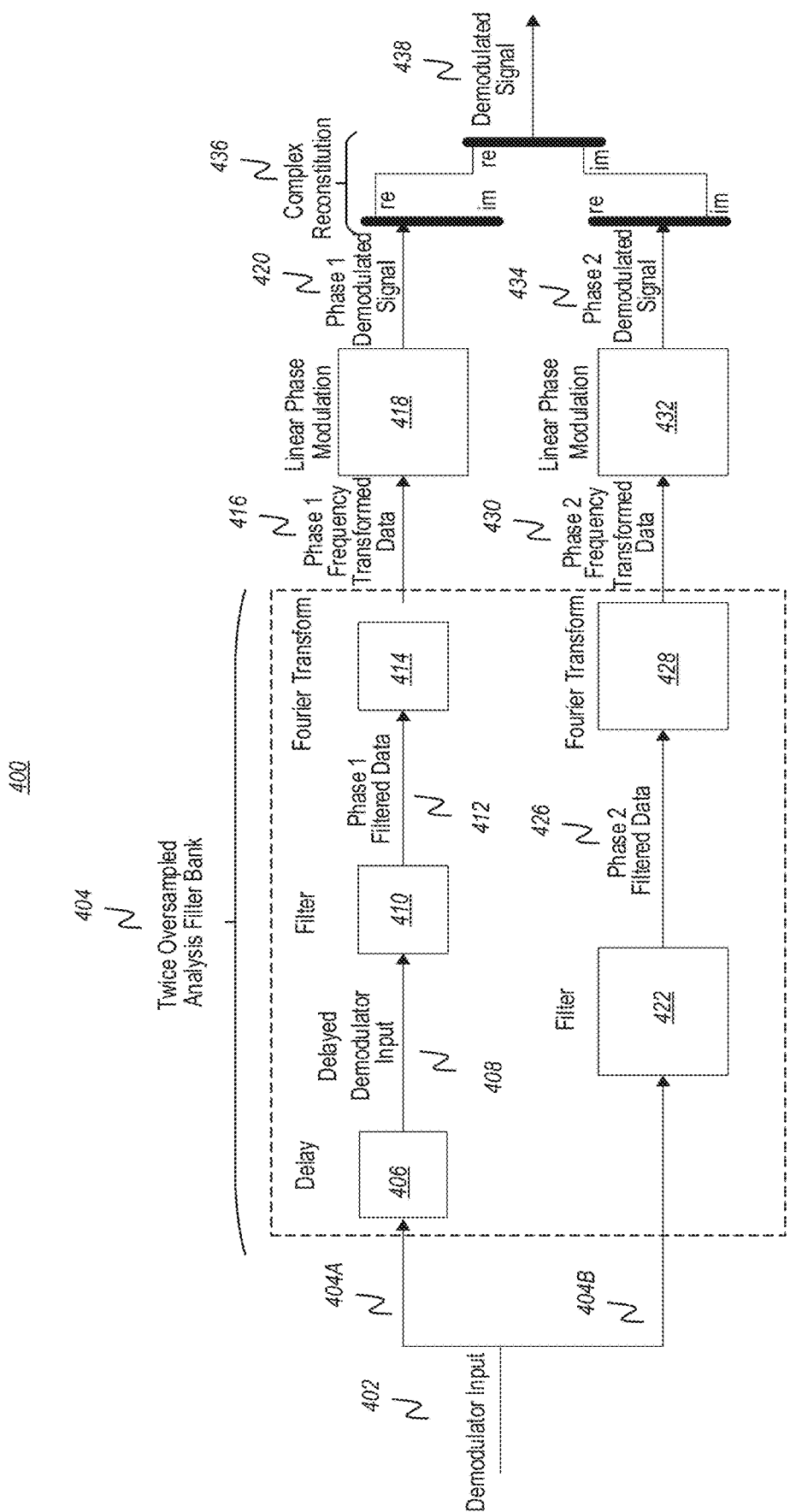
FIG. 4 discloses aspects of an embodiment of a conventional SMT demodulator.

FIG. 4 illustrates an embodiment of an SMT demodulator 400. The SMT demodulator may be a specific implementation of the demodulator 150 and/or demodulator 256 previously described. Thus, the SMT demodulator 400 may be used in the receiver system 250. The specific operation and functional elements of the SMT demodulator 400 will now be explained.

As shown in FIG. 4, the SMT demodulator 400 receives a demodulator input data frame 402. The demodulator input data frame 402 is input into an Analysis Filter Bank (AFB) 404, which in the illustrated embodiment is a twice oversampled AFB. The AFB 404 includes a first branch 404A and a second branch 404B, each of which receive the demodulator input data frame 402.

In the first branch 404A, the demodulator input data frame 402 is received by a time delay module 406. Like the time delay module 336, the time delay module 406 delays the demodulator input data frame 402 by one-half a data frame. The time delay module 406, outputs a delayed demodulator input data frame 408, which is input into a filter 410. In one embodiment, the filter 410 is a polyphase analysis filter.

The filter 410 outputs phase one filtered data frame 412, which is then input into a Fourier transform module 414. In some embodiments, an inverse Fourier transform module may be used in place of the Fourier transform module 414. In operation, the Fourier transform module 414 transforms the phase one filtered data frame 412 from the time domain into the frequency domain and outputs phase one filtered transformed data frame 416.

The phase one filtered transformed data frame 416 is input into a linear phase demodulation module 418 that provides linear phase modulation on the phase one filtered transformed data frame 416. The linear phase demodulation module 418 outputs phase one demodulated data frame 420.

In the second branch 404B, the demodulator input data frame 402 is received by a filter 422. In one embodiment, the filter 422 is a polyphase analysis filter. The filter 422 outputs phase two filtered data frame 426, which is then input into a Fourier transform module 428. In some embodiments, an inverse Fourier transform module may be used in place of the Fourier transform module 428. In operation, the Fourier transform module 428 transforms the phase two filtered data frame 426 from the time domain into the frequency domain and outputs phase two filtered transformed data frame 430.

The phase two filtered transformed data frame 430 is input into a linear phase demodulation module 432 that provides linear phase modulation on the phase two filtered transformed data frame 430. The linear phase demodulation module 432 outputs phase two demodulated data frame 434.

The SMT demodulator 400 further includes a complex reconstruction module 436. In operation, the complex reconstruction module 436 extracts the real components from the phase two demodulated data frame 420 and extracts the imaginary components from the phase two demodulated data frame 434. The complex reconstruction module 436 then combines the extracted real and imaginary components into a demodulator output data frame 438 that can be used by the other elements of the receiver system as needed.

C. Detailed Description of Example Embodiments of the Invention

Figure 5:
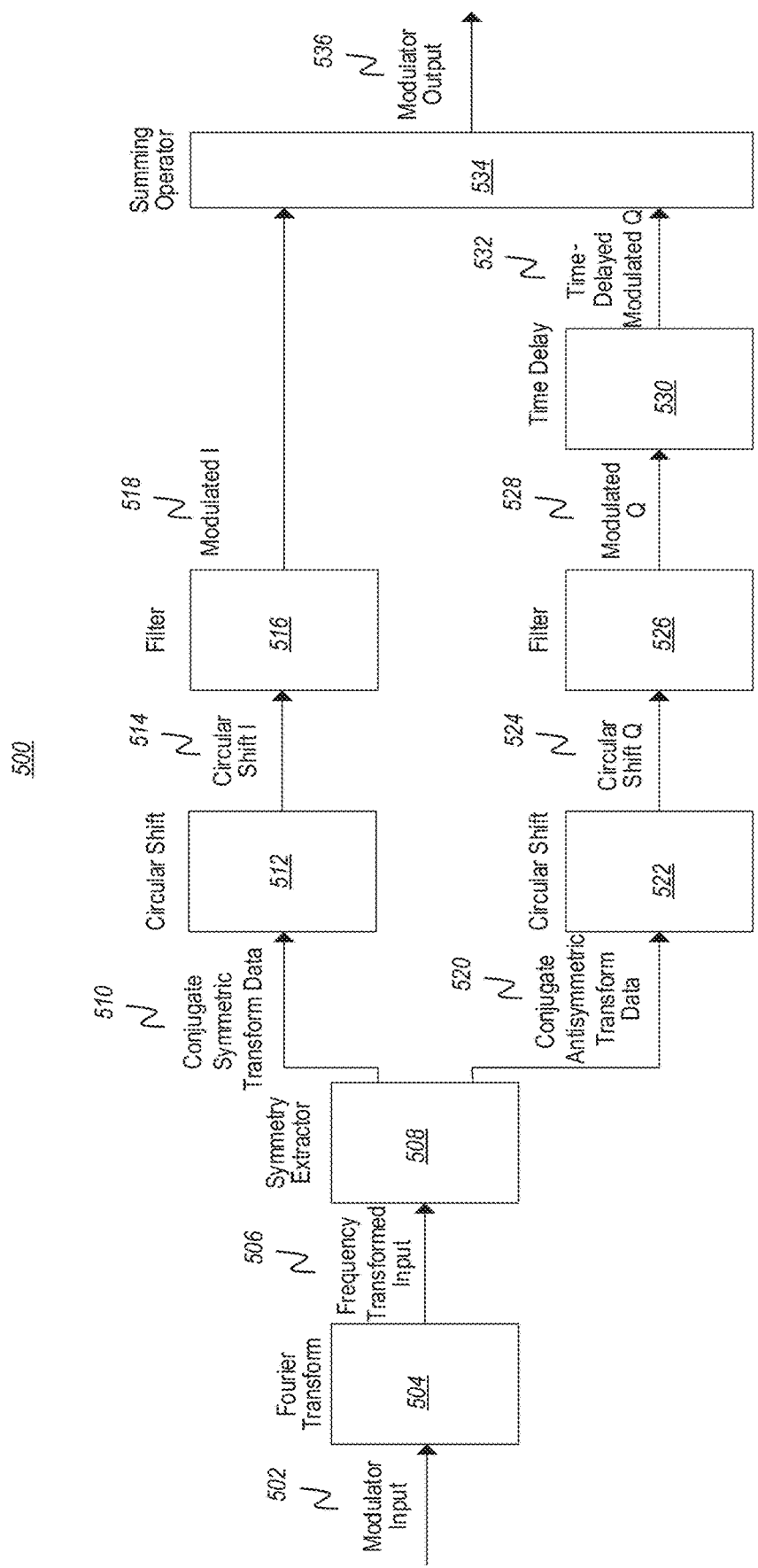
FIG. 5 discloses aspects of an embodiment of an SMT modulator according to the current invention.

FIG. 5 illustrates an embodiment of a novel SMT modulator 500 according to the principles of the invention disclosed herein. The novel SMT modulator 500 provides improvements and advantages over the SMT modulator 300 as will be explained in more detail to follow. The SMT modulator 500 may be a specific implementation of the modulator 120 and/or modulator 214 previously described. Thus, the SMT modulator 500 may be used in the transmitter system 210. The specific operation and functional elements of the SMT modulator 500 will now be explained.

As illustrated, the SMT modulator 500 receives a modulator input data frame 502, which may be complex valued input data having both real and imaginary components. As previously described in relation to FIGS. 1 and 2B, the modulator input data frame 502 may be encoded data that has been encoded in any reasonable manner.

The modulator input data frame 502 is input into a Fourier transform module 504. In some embodiments, the Fourier transform module 504 may be implemented as a Fast Fourier Transform (FFT) or an Inverse Fast Fourier Transform (IFFT). In operation, the Fourier transform module 504 transforms the modulator input data frame 502 from the frequency domain into the time domain and outputs transformed data frame 506.

The transformed data frame 506 is the input into a symmetry extractor 508. In operation, the symmetry extractor 508 extracts conjugate symmetric transform data frame 510 and conjugate antisymmetric transform data frame 520. The symmetry extractor 508, when extracting the conjugate symmetric transform data frame 510 and conjugate antisymmetric transform data frame 520, applies the Fourier duality principle, where the real output of the Fourier transform module 504 (or an inverse Fourier transform module) corresponds to a conjugate symmetric output and the imaginary output corresponds to an antisymmetric conjugate output. The conjugate symmetric output and the antisymmetric conjugate output are determined by looking at the output around the center of the transform data frame. The conjugate symmetric transform data frame 510 is comprised of the transform of the real components of the data frame 506. The conjugate antisymmetric transform data frame 520 is comprised of the transform of the imaginary components of the data frame 506.

The conjugate symmetric transform data frame 510 is provided to a circular shift module 512. In operation, the circular shift module 512 provides a circular rotational phase shift in the time domain for the conjugate symmetric transform data frame 510. Thus, rather than providing a linear phase modulation as is done in the SMT modulator 300, a circular rotational phase shift is provided in the time domain to produce circular shifted in-phase data frame 514.

The circular shifted in-phase data frame 514 is input to a filter 516, which provides needed filtering on the circular shifted in-phase data frame 514 by filtering out unwanted components. In one embodiment, the filter 516 may be a polyphase synthesis filter. The filter 516 outputs modulated in-phase data frame 518. In some embodiments, the circular shift module 512 and the filter 516 comprise a Synthesis Filter Bank (FSB).

The conjugate antisymmetric transform data frame 520 is provided to a circular shift module 522. In operation, the circular shift module 522 provides a circular rotational phase shift in the time domain for the conjugate antisymmetric transform data frame 520. Thus, rather than providing a linear phase modulation as is done in the SMT modulator 300, a circular rotational phase shift is provided in the time domain to produce circular shifted quadrature data frame 524.

The circular shifted quadrature data frame 524 is input to a filter 526, which provides needed filtering on the circular shifted quadrature data frame 524 by filtering out unwanted components. In one embodiment, the filter 526 may be a polyphase synthesis filter. The filter 526 outputs modulated quadrature data frame 528. In some embodiments, the circular shift module 522 and the filter 526 comprise a Synthesis Filter Bank (FSB).

The filter 526 outputs the modulated quadrature data frame 528 to a time delay module 530, which in one embodiment delays the modulated quadrature data frame 528 by one-half a data frame or 128 samples. The time delay module 530 outputs time-delayed modulated quadrature data frame 532. Although the time delay module 530 is shown as a single element, this is for ease of illustration in some embodiments. In such embodiments, the time delay module 530 represents that the time delay may be distributed across the other elements such as the circular shift module 522 and the filter 526.

The modulated in-phase data frame 518 and the time-delayed modulated quadrature data frame 532 are both input into a summing operator module 534. The summing operator module 534 sums the modulated in-phase data frame 518 and the time-delayed modulated quadrature data frame 532 and outputs a modulator output data frame 536 that can be provided to a transmitter module such as the transmitter module 216.

Figure 6:
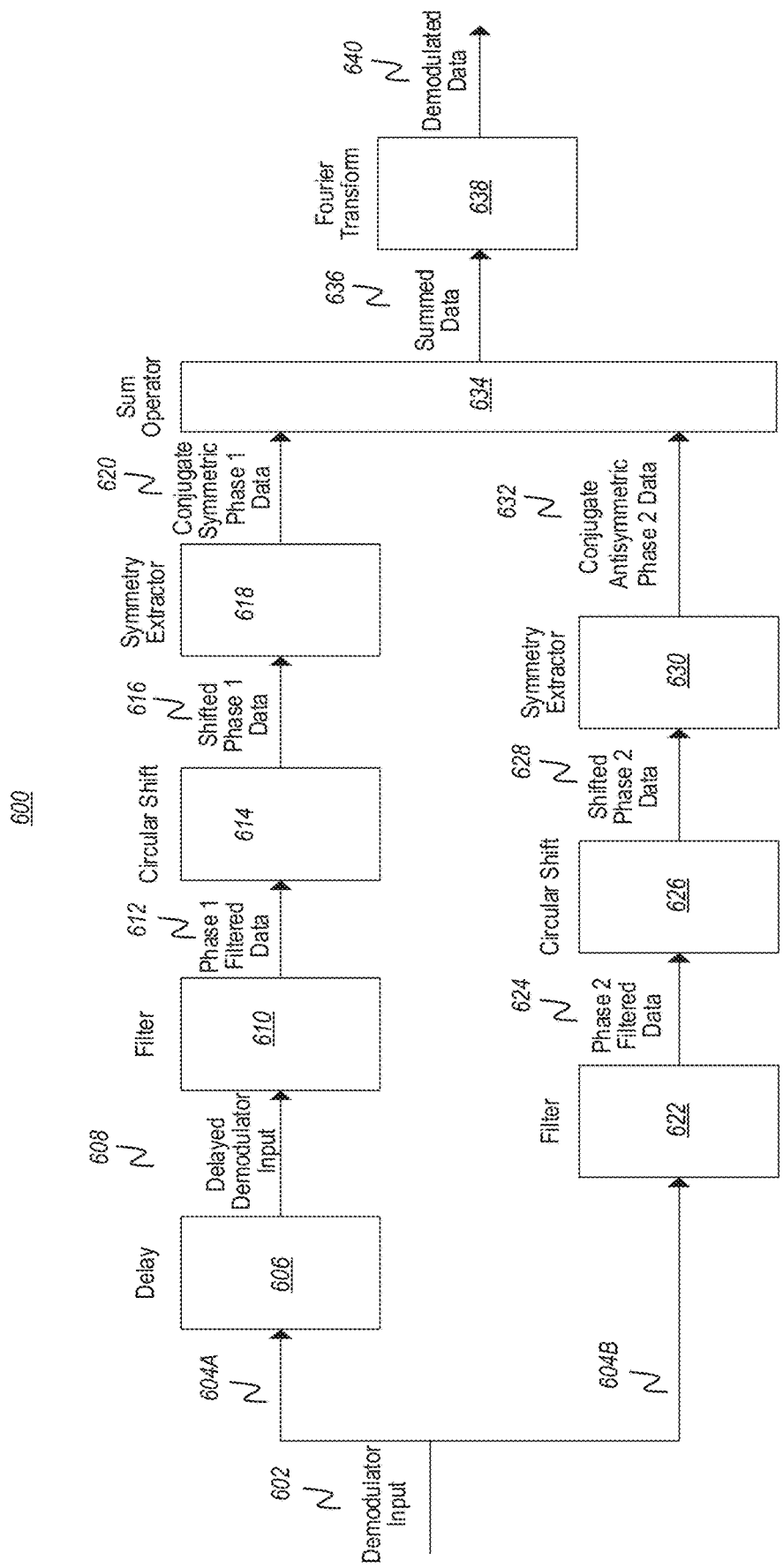
FIG. 6 discloses aspects of an embodiment of an SMT demodulator according to the current invention.

FIG. 6 illustrates an embodiment of a novel SMT demodulator 600 according to the principles of the invention disclosed herein. The novel SMT demodulator 600 may be a specific implementation of the demodulator 150 and/or demodulator 256 previously described. Thus, the SMT demodulator 600 may be used in the receiver system 250. The specific operation and functional elements of the SMT demodulator 600 will now be explained.

As shown in FIG. 6, the SMT demodulator 600 receives a demodulator input data frame 602. The demodulator input data frame 602 is input into a first branch 604A and a second branch 604B.

In the first branch 604A, the demodulator input data frame 402 is received by a time delay module 606. The time delay module 606 delays the demodulator input data frame 602 by one-half a data frame. The time delay module 606, outputs a delayed demodulator input data frame 608, which is input into a filter 610. In one embodiment, the filter 610 is a polyphase analysis filter. Although the time delay module 606 is shown as a single element, this is for ease of illustration in some embodiments. In such embodiments, the time delay module 606 represents that the time delay may be distributed across the other elements such as the circular shift module 614 and the filter 610.

The filter 610 outputs phase one filtered data frame 612, which is then input into a circular shift module 614. In operation, the circular shift module 614 provides a circular rotational phase shift in the time domain for the phase one filtered data frame 612. Thus, rather than providing a linear phase modulation as is done in the SMT demodulator 400, a circular rotational phase shift is provided in the time domain to produce circular shifted phase one data frame 616. In one embodiment, the filter 610 and the Fourier transform module 638 comprise an Analysis Filter Bank (AFB).

The circular shifted phase one data frame 616 is input into a symmetry extractor 618. In operation, the symmetry extractor 618 applies the Fourier duality principle and extracts conjugate symmetric phase one data frame 620, whose Fourier transform comprises the real components of the demodulator output data frame 640.

In the second branch 604B, the demodulator input data frame 402 is input into a filter 622. In one embodiment, the filter 622 is a polyphase analysis filter. In one embodiment, the filter 622 is the same filter as the 610. Thus, in such embodiments there is a single filter module that is implemented as part of the SMT demodulator 600.

The filter 622 outputs phase two filtered data frame 624, which is then input into a circular shift module 626. In operation, the circular shift module 626 provides a circular rotational phase shift in the time domain for the phase two filtered data frame 624. Thus, rather than providing a linear phase modulation as is done in the SMT demodulator 400, a circular rotational phase shift is provided in the time domain to produce circular shifted phase two data frame 628. In one embodiment, the filter 622 and the Fourier transform module 638 comprise an Analysis Filter Bank (AFB).

The phase two filtered data frame 624 is input into a symmetry extractor 630, which in some embodiments is the same as the symmetry extractor 618. Thus, in such embodiments there is a single symmetry extractor that is implemented as part of the SMT demodulator 600. In operation, the symmetry extractor 630 applies the Fourier duality principle and extracts conjugate antisymmetric phase two data frame 632, whose Fourier transform comprises the imaginary components of the demodulator output data frame 640.

The SMT demodulator 600 further includes a summing operator module 634. The summing operator module 634 sums the conjugate symmetric phase one data frame 620 and the conjugate antisymmetric phase two data frame 632 and outputs a complexed valued summed data frame 636.

The complexed valued summed data frame 636 is input into a Fourier transform module 638. In some embodiments, the Fourier transform module 638 may be implemented as a Fast Fourier Transform (FFT) or an Inverse Fast Fourier Transform (IFFT). In operation, the Fourier transform module 638 transforms the complexed valued summed data frame 636 from the time domain into the frequency domain and outputs demodulator output data frame 640 that can be used by the other elements of the receiver system 250 as needed.

As mentioned previously, the SMT modulator 500 provides improvements and advantages over the SMT modulator 300. Likewise, the SMT demodulator 600 provides improvements and advantages over the SMT demodulator 400. Some of the improvements and advantages will now be explained.

A comparison of FIGS. 3A and 5 shows that the embodiment of the SMT modulator 300 requires two Fourier transform modules while the SMT modulator 500 only requires a single Fourier transform module. That is, the SMT modulator 300 requires the inverse Fourier transform module 312 for in-phase data frame and the inverse Fourier transform module 328 for the quadrature data frame to generate the modulator output data frame 342. However, the SMT modulator 500 only requires the Fourier transform module 504 for both the in-phase data frame and the quadrature data frame to generate the modulator output data frame 536. Accordingly, the SMT modulator 500 is able to generate the modulator output with only one-half as many Fourier transform modules. This in turn leads to a savings in computing system resources needed to implement the SMT modulator 500.

In a similar manner, a comparison of FIGS. 4 and 6 shows that the embodiment of the SMT demodulator 400 requires two Fourier transform modules while the SMT demodulator 600 only requires a single Fourier transform module. That is, the SMT demodulator 400 requires the Fourier transform module 414 for the phase one data frame and the Fourier transform module 428 for the phase two data frame to generate the demodulator output data frame 438. However, the SMT demodulator 600 only requires the Fourier transform module 638 for both the phase one data frame and the phase two data frame to generate the demodulator output data frame 640. Accordingly, the SMT demodulator 600 is able to generate the demodulator output with only one-half as many Fourier transform modules. This also leads to a savings in computing system resources needed to implement the SMT demodulator 600.

FIG. 7A illustrates an example comparison of computing system resource usage needed to implement an AFB+SFB 710 that includes a 128-point FFT according to the SMT modulator 300 and demodulator 400 and to implement an AFB+SFB 720 that includes the 128-point FFT according to the SMT modulator 500 and demodulator 600. FIG. 7A also illustrates several different resources of a computing system such as a computing system 800 of FIG. 8 that can be used to implement the AFB+SFB 710 and the AFB+SFB 720. The different computing system resources include total look up tables (LUTs) 701, logic LUTs 702, look up table Random Access Memory (LUTRAMs) 703, Shift Register Logic or Shift Register LUT (SRLs) 704, Flip Flops (FFs) 705, 36 k block RAM (RAMB36) 706, 18 k block RAM (RAMB18) 707, and Digital Signal Processor blocks (DSP) blocks 708.

As shown in the figure at 730, taking the difference in the computing resources needed to implement the AFB+SFB 710 and the AFB+SFB 720 shows that it takes fewer computing resources to implement the AFB+SFB 720 than the AFB+SFB 710. For example, there is a 15% reduction in the total number of LUTs 701, a 19% reduction in the number of Logic LUTs 702, a 50% reduction in the number of LUTRAMs 703, a 50% reduction in the number of RAMB18s 707, and a 23% reduction in the number of DSP blocks 708. Although there in an increase in the number of SRLs 704 and FFs 705 needed for the AFB+SFB 720, the overall computing resources are less.

The total computing resources available is shown at 740. The bottom half of FIG. 7A shows the ratio of AFB+SFB 710/the total computing resources and the ratio of AFB+SFB 720/the total computing resources. As shown at 750, for most of the resources 701-708, AFB+SFB 720 uses a lower number of resources compared to the total computing resources than AFB+SFB 710.

Figure 7B:
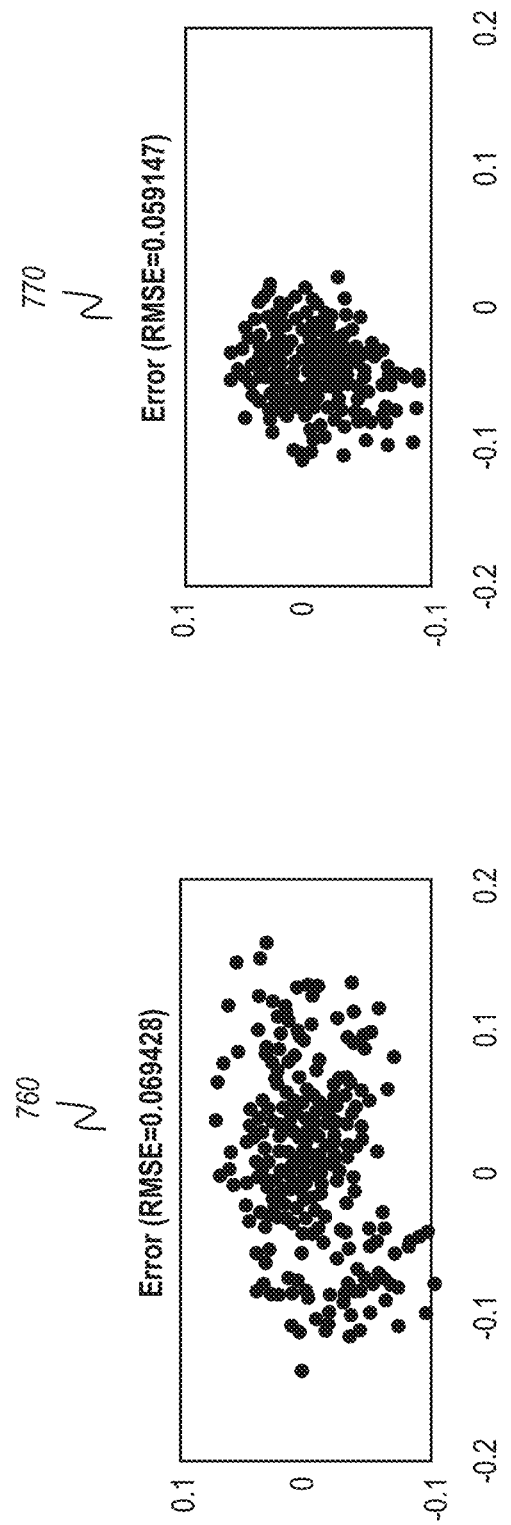

FIG. 7B shows performance results 760 of the SMT modulator 300 and the SMT demodulator 400 and performance results 770 of the SMT modulator 500 and the SMT demodulator 600. As shown, the performance results are similar to each other.

Taken together, FIGS. 7A and 7B show that SMT modulator 500 and the SMT demodulator 600 of the present invention achieve a similar or better result than the SMT modulator 300 and the SMT demodulator 400 while using less computing system resources. Thus, the SMT modulator 500 and the SMT demodulator 600 provide the technical benefit of resource and cost savings and represent a technical improvement over the SMT modulator 300 and the SMT demodulator 400.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer-readable hardware storage media devices, which are physical media for carrying or having computer-executable instructions or data structures stored thereon. Such computer storage media may be any available physical media that may be accessed by a general purpose or special purpose computer.

By way of example, and not limitation, such computer storage media devices may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software operations, objects, or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
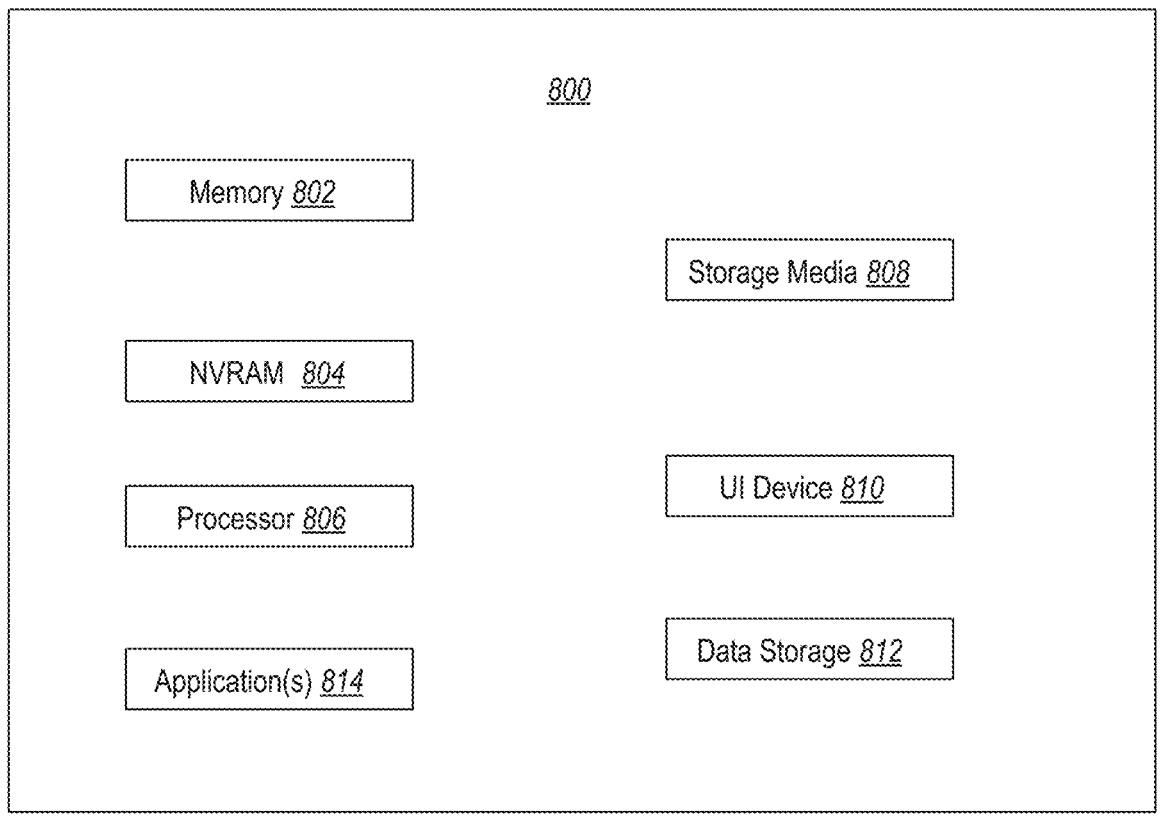
FIG. 8 discloses an example computing entity configured and operable to perform any of the disclosed methods, processes, and operations.

With reference briefly now to FIG. 8, any one or more of the entities disclosed, or implied, by FIGS. 1-7B, and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A staggered multi-tone (SMT) modulator comprising:
a Fourier transform module that is coupled to an input for receiving a complex valued data frame, the Fourier transform module configured to transform the complex valued data frame from a frequency domain into a time domain;
a symmetry extractor module configured to extract a conjugate symmetric data frame and a conjugate antisymmetric data frame from the transformed complex data frame;
a first circular shift module configured to perform a circular rotational phase shift on the conjugate symmetric data frame;
a first filter configured to filter the phase shifted conjugate symmetric data frame;
a second circular shift module configured to perform a circular rotational phase shift on the conjugate antisymmetric data frame;
a second filter configured to filter the phase shifted conjugate antisymmetric data frame; and
a summing module configured to sum the phase shifted conjugate symmetric data frame and the phase shifted conjugate antisymmetric data frame to generate a modulated data frame for an output that is coupled to the summing module.

2. The computing system of claim 1, further comprising:
a time delay module coupled to either the first or second filter, the time delay module providing a time delay of one-half of a data frame.

3. The computing system of claim 2, wherein the time delay module is at least partially distributed across one or more elements of the SMT modulator.

4. The computing system of claim 1, wherein the first and second filter modules comprise one or more polyphase filters.

5. The computing system of claim 1, wherein the Fourier transform module is implemented as a Fast Fourier Transform (FFT).

6. The computing system of claim 1, wherein the Fourier transform module is implemented as an Inverse Fast Fourier Transform (IFFT).

7. The computing system of claim 1, wherein because the conjugate symmetric data frame and the conjugate antisymmetric data frame are subjected to the circular rotational phase shift in the time domain, no linear phase modulation in the frequency domain is performed by the SMT modulator.

8. The computing system of claim 1, wherein the SMT modulator is configured to be used in a digital transmitter.

9. The computing system of claim 1, wherein the SMT modulator is instantiated in an Application Specific Integrated Circuit (ASIC) or in a Field Programable Gate Array (FPGA).

10. The computing system of claim 1, wherein the SMT modulator is implemented in a computing system that includes one or more processors and one or more computer-readable hardware storage devices having stored thereon computer-executable instructions that are structured such that when executed by the one or more processors, cause the computing system to instantiate the SMT modulator.

11. A staggered multi-tone (SMT) demodulator comprising:
   a filter configured to filter a complex valued data frame received from a demodulator input to generate a phase one filtered data frame and a phase two filtered data frame;
   a first circular shift module configured to perform a circular rotational phase shift on the phase one filtered data frame;
   a second circular shift module configured to perform a circular rotational phase shift on the phase two filtered data frame;
   a symmetry extractor module configured to extract a conjugate symmetric data frame from the phase one filtered data frame and to extract a conjugate antisymmetric data frame from the phase two filtered data frame;
   a summing module configured to sum the conjugate symmetric data frame and the conjugate antisymmetric data frame to generate a summed data frame; and
   a Fourier transform module configured to transform the summed data frame from a time domain to a frequency domain to generate a demodulated data frame for an output that is coupled to the Fourier transform module.

12. The computing system of claim 11, further comprising:
   a time delay module coupled to the filter, the time delay module providing a time delay of one-half of a data frame.

13. The computing system of claim 12, wherein the time delay module is at least partially distributed across one or more elements of the SMT demodulator.

14. The computing system of claim 11, wherein the filter module comprises one or more polyphase filters.

15. The computing system of claim 14, wherein the filter module comprises a first filter module and a second filter module.

16. The computing system of claim 11, wherein the Fourier transform module is implemented as one of a Fast Fourier Transform (FFT) or an Inverse Fast Fourier Transform (IFFT).

17. The computing system of claim 11, wherein because the phase one filtered data frame and the phase two filtered data frame are subjected to the circular rotational phase shift in the time domain, no linear phase modulation in the frequency domain is performed by the SMT demodulator.

18. The computing system of claim 11, wherein the SMT demodulator is configure to be used in a digital receiver.

19. The computing system of claim 11, wherein the SMT demodulator is instantiated m an Application Specific Integrated Circuit (ASIC) or in a Field Programable Gate Array (FPGA).

20. The computing system of claim 11, wherein the SMT modulator is implemented in a computing system that includes one or more processors and one or more computer-readable hardware storage devices having stored thereon computer-executable instructions that are structured such that, when executed by the one or more processors, cause the computing system to instantiate the SMT demodulator.

* * * * *